United States Patent
Stripling et al.

[11] 3,839,904
[45] Oct. 8, 1974

[54] MAGNETIC FLUID LEVEL DETECTOR AND VIBRATION TRANSDUCER

[75] Inventors: William W. Stripling; Harold V. White; Joe S. Hunter, all of Huntsville, Ala.

[73] Assignee: The United States of America as represented by the Secretary of the Army, Washington, D.C.

[22] Filed: Sept. 18, 1972

[21] Appl. No.: 289,910

[52] U.S. Cl.................. 73/71.2, 73/516, 336/130
[51] Int. Cl..................... G01h 11/00, G01p 15/08
[58] Field of Search ....... 73/71.4, 170 A, 71.2, 516; 33/366, 367, 377; 336/DIG. 3, 130, 134

[56] References Cited
UNITED STATES PATENTS

| | | |
|---|---|---|
| 2,711,590 | 6/1955 | Wilcox.................................. 33/366 |
| 3,184,861 | 5/1965 | Conrad.................................. 33/366 |
| 3,464,276 | 9/1969 | Leibert........................... 73/516 LM |
| 3,478,437 | 11/1969 | Cothran............................. 73/170 A |
| 3,516,294 | 6/1970 | Schmieder..................... 73/516 LM |
| 3,536,932 | 10/1970 | Humbert-Droz................ 336/130 X |
| 3,618,367 | 11/1971 | Merrill................................ 73/71.4 |

*Primary Examiner*—James J. Gill
*Attorney, Agent, or Firm*—Edward J. Kelly; Herbert Berl; Harold W. Hilton

[57] ABSTRACT

A level detector and vibration transducer employing a magnetic fluid sensing element to measure tilt and vibration. The level detector and vibration transducer is used to measure tilt about an axis in a nominally horizontal plane. The device can also be used to monitor vibration along any specified axis. This is accomplished by mounting the transducer along the specified axis and subjecting the transducer to successive vibratory forces for successive displacements of the magnetic fluid in the vial. The moving system (or sensor) consists of a vial partially filled with a magnetic fluid encompassed by a linear variable differential transformer pickoff. When the magnetic fluid is equally distributed in the vial, there is equal coupling between the two magnetic field coils and the output voltage is zero. A slight tilt will displace more of the magnetic fluid to one side and will unbalance the magnetic field causing an A.C. voltage to exist between the two pickoff coils. The amplitude of the A.C. voltage is proportional to the amount of tilt and the phase is proportional to the direction of tilt.

2 Claims, 4 Drawing Figures

PATENTED OCT 8 1974

3,839,904

2a

2b

3a

3b

4a

4b

MAGNETIC FLUID LEVEL DETECTOR AND VIBRATION TRANSDUCER

BACKGROUND OF THE INVENTION

There is a number of level detectors in existence that are capable of measuring small angular deviation. These indicators, however, do not have pickoff devices that will permit them to be used to provide out of level indications to remote areas. Thus, these devices are good only for surveying applications and leveling; for example, a test table in a laboratory.

A few companies have built air bearing level indicators. These also have limited use since they can function only where a clean air supply is available and, in general, do not exhibit better than 5 to 10 arc seconds of resolution.

The objective sought with this magnetic fluid sensing device is to simplify the design of the tilt indicator and vibration transducer by eliminating the requirement for an external clean air supply. This will, in turn, reduce cost and improve reliability. Efforts are continuously being made to devise new and improved methods of measuring angular tilt and sensing vibration acceleration.

SUMMARY OF THE INVENTION

The apparatus of the present invention is a device for measuring tilt about an axis in a nominally horizontal plane and vibration along any specified axis. The device includes a sensor consisting of a vial partially filled with a magnetic fluid. The vial is encompassed by a linear variable differential transformer pickoff. The linear variable differential transformer pickoff modulates the amplitude of an A.C. carrier voltage in accordance with the linear displacement of the magnetic fluid free to move axially inside a cylindrical coil structure. The linear variable differential transformer is used as a transducer for linear displacement in the positive and negative direction with respect to a reference or null.

The coil structure consists of a primary winding to which a source of alternating voltage is connected and a secondary winding made up of two coils connected in series opposition. When the magnetic fluid is symmetrical about the center of the structure, equal voltages are induced in both secondaries and the net output voltage is almost zero. If, however, the magnetic fluid is displaced axially, the voltage induced in that secondary coil toward which the fluid moves in increased, while the voltage induced in the other secondary coil is decreased. A net voltage then results at the secondary output and has a fixed phase angle $\phi$ with respect to the primary excitation when the magnetic fluid is displaced in one direction from the reference or null position, and a fixed phase angle $\phi - 180°$ when the fluid is displaced in the opposite direction. The magnitude of the net secondary voltage is a measure of the displacement distance. The unit is designed to have a nearly linear relationship between magnitude of net secondary voltage and magnitude of displacement over its operating ranges.

DESCRIPTION OF THE PREFERRED EMBODIMENT

Figure 1:
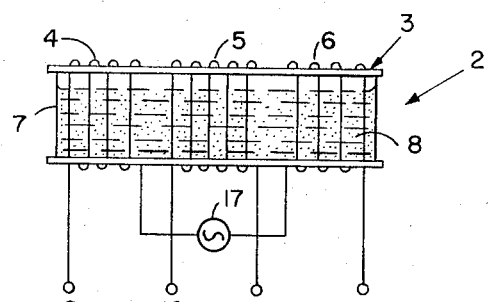
FIG. 1 is a diagrammatic view of the detector and vibration transducer including the linear variable differential transformer pickoff coils.

Referring now to the drawings, there is disclosed a preferred embodiment of the invention in FIGS. 1-4. As shown in FIG. 1, the magnetic fluid level detector and vibration transducer 2 includes a coil form 3, a plurality of coils 4, 5 and 6 defining a linear variable differential transformer pickoff, and a vial 7 partially filled with a magnetic fluid 8 which moves axially. The vial 7 is encompassed by linear variable differential transformer pickoff 4, 5 and 6. The linear variable differential transformer pickoff 4, 5 and 6 modulates the amplitude of an A.C. carrier voltage in accordance with the linear displacement of the magnetic fluid 8 to move axially inside the cylindrical coil structure 3. The linear variable differential transformer 4, 5 and 6 is used as a transducer for linear displacement in the positive and negative direction with respect to a reference or null.

Figure 2:
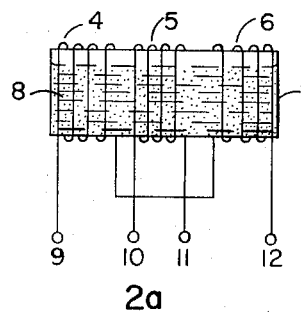
FIGS. 2, 3 and 4 illustrate the output of the device corresponding to various tilt angles.
Figure 2:
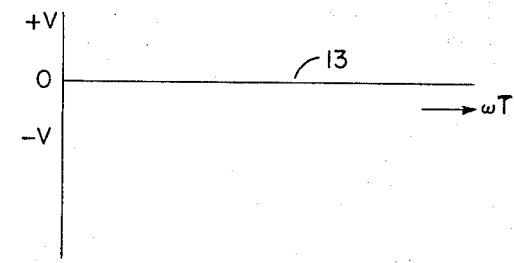
Figure 3:
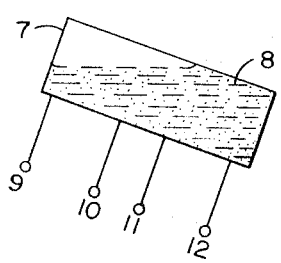
Figure 3:
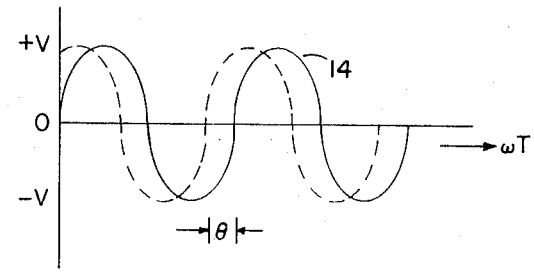
Figure 4:
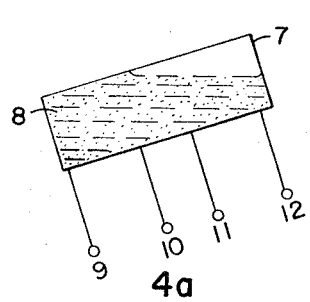
Figure 4:
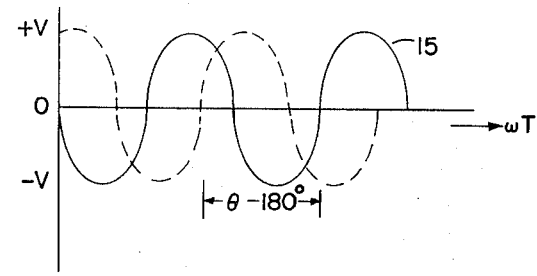

The coil structure includes a primary winding 5 to which a source of alternating voltage 17 is connected (terminals 10 and 11), and a secondary winding made up of two coils 4 and 6 connected in series opposition. When the magnetic fluid 8 is symmetrical about the center of the structure (FIG. 2) equal voltages are induced in both secondaries 4 and 6 and, as seen in FIG. 2b, the net output voltage 13 (between terminals 9 and 12) is almost zero. If, however, the magnetic fluid 8 is displaced axially, as shown in FIG. 3a, the voltage induced in that secondary coil 6 toward which the fluid 8 moves is increased, while the voltage induced in the other secondary coil 4 is decreased. A net voltage 14, as shown in FIG. 3b, then results at the secondary output 9 and 12 and has a fixed angle $\phi$ with respect to the primary excitation (across terminals 10 and 11) when the magnetic fluid 8 is displaced in one direction (FIG. 3) from the reference or null position (FIG. 2), and a fixed angle $\phi - 180°$ and a net voltage 15 when the fluid 8 is displaced in the opposite direction (FIG. 4). The magitude of the net secondary voltage 13, 14 or 15, is a measure of the displacement distance. The unit is designed to have a nearly linear relationship between magnitude of net secondary voltage 13, 14 or 15 and magnitude of displacement over its operating range.

The magnetic fluid level detector and vibration transducer can be used in applications involving inertial platform leveling and off-level warning indicators. The device can also be used to monitor vibration along any specified axis.

We claim:

1. A level detector and vibration transducer comprising:
   a. a vial;
   b. magnetic fluid sensing means carried in said vial; and
   c. pickoff means disposed in surrounding relation with said vial for sensing the displacement of said magnetic fluid responsive to motion of said vial, said pickoff means including a pair of secondary windings, each carried at opposite ends of said vial and connected in series opposition, and a primary winding disposed intermediate said secondary windings and connected to a source of alternating current.

2. A level detector and vibration transducer as in claim 1 wherein said pickoff means is disposed for modulating the amplitude of said alternating current signal magnetically coupled from the primary windings to the secondary windings in accordance with the linear displacement of the magnetic fluid to move axially inside said linear variable differential transformer.

* * * * *